United States Patent [19]
Lambooy

[11] 3,959,936
[45] June 1, 1976

[54] TRANSPORTABLE HOUSE, PARTICULARLY OF THE CARAVAN-TYPE

[76] Inventor: Guus Lambooy, Meije 90, Gemeente Bodegraven, Netherlands

[22] Filed: Mar. 31, 1975

[21] Appl. No.: 563,720

[52] U.S. Cl. .................................. 52/65; 296/23 F
[51] Int. Cl.² ........................................ E04B 1/346
[58] Field of Search ...................... 52/64, 65, 143; 296/23 F

[56] References Cited
UNITED STATES PATENTS

| | | | |
|---|---|---|---|
| 1,433,547 | 10/1922 | Hadden | 52/65 |
| 2,144,083 | 1/1939 | Rentfrow | 52/65 |
| 3,655,236 | 4/1972 | Hair | 52/65 |
| 3,737,191 | 6/1973 | Fackre | 52/65 |

FOREIGN PATENTS OR APPLICATIONS

| 775,718 | 1/1935 | France | 52/65 |
|---|---|---|---|

Primary Examiner—Ernest R. Purser
Assistant Examiner—Henry Raduazo
Attorney, Agent, or Firm—Marshall & Yeasting

[57] ABSTRACT

At least two sections are arranged one behind another on a common integral substructure which is mounted on wheels, said sections being generally rectangular in plan and having vertical sides. Each of said sections is mounted on a pivot located in the central longitudinal plane of said common integral substructure, at least one of said pivots being longitudinally slidable in said substructure. Two sections are hinged together at one corner of each section, and are movable on their pivots, from a transport position in which they are longitudinally aligned with one another and with said substructure, to a transverse position of use in which a side of one section and a side of the other section, formerly in alignment, are folded together on said hinge.

1 Claim, 7 Drawing Figures

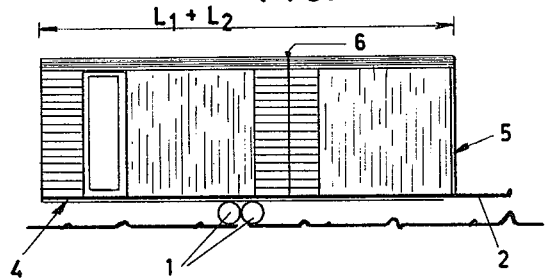
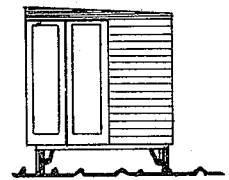
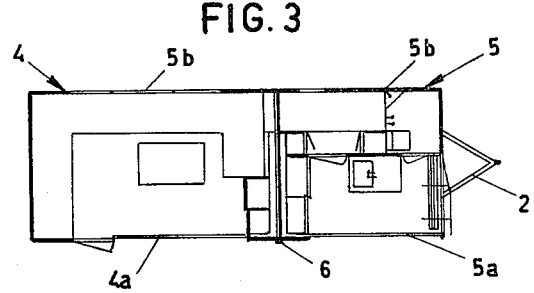
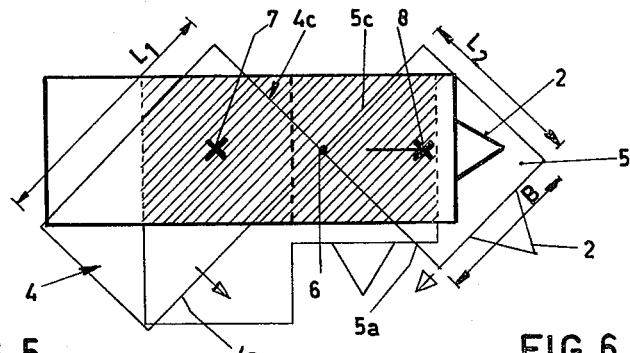
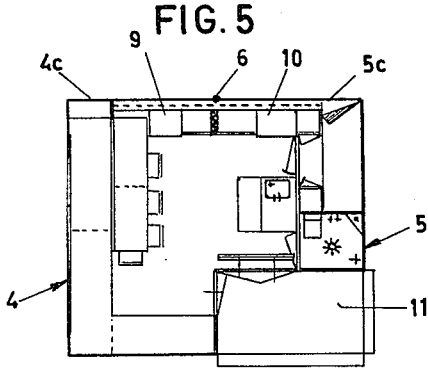
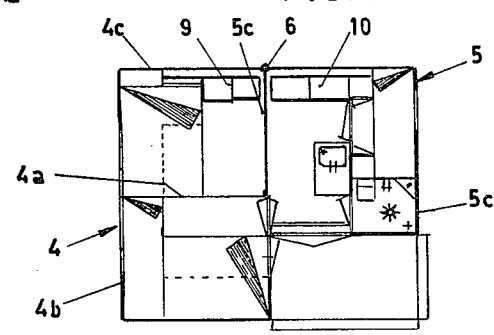

TRANSPORTABLE HOUSE, PARTICULARLY OF THE CARAVAN-TYPE

BACKGROUND OF THE INVENTION

The invention relates to a transportable house, particularly of the caravan type, which is divided along a substantially vertical plane into at least two sections which are movable with respect to each other between a transport position in which the sections are arranged one behind the other according to a rectangle of limited width, and a position of use in which the sections occupy a base area, the length as well as the width of which is larger than the width in the transport position, both sections being coupled to each other in such a manner that they are pivotable around an axis contained in one of the longitudinal side walls of the sections.

The use of the so-called caravan as a transportable holiday or season house gradually increases. Together with the need of more comfort also the demand for larger caravans increases. Up till now one has attempted mainly to satisfy the last-mentioned need by increasing the length of the caravan, since the width is tied to a relatively low limit in connection with the regulations in force for the normal road transport. Therefore such caravans have a rectangular base area, the length of which is a multiple of the comparatively small width. The elongated space is mostly seen as less practical in connection with the possibilities for the geography and arranging of living, working and sleeping compartments.

A known caravan of the hereinbefore described type attempts to meet the above-mentioned objections by shifting the sections, which are pivotable with respect to each other, from the transport position to a position in which the total base area has a much more practical length to width ratio.

In this known transportable house both sections form in fact independent houses or caravans respectively, each having its own substructure or chassis frame and its own wheel assemblies. The result is that displacing the sections with respect to each other on not too smooth grounds may produce a considerable strain on the pivotal connection between both sections, which may easily lead to mutual torsion.

SUMMARY OF THE INVENTION

The invention aims at improving said known construction so that the sections may be brought from and into the transport position also on uneven grounds quickly and easily and without substantial loads on the pivotal connection between the sections.

This aim is attained according to the invention in that the transportable house is characterized by an integral common substructure dimensioned in correspondence with the width of the base area in the transport position, on which substructure both sections are each pivotally mounted around an axis situated in the central longitudinal plane of the substructure, at least one of the sections being moreover slidably guided in the central longitudinal plane.

BRIEF DESCRIPTION OF THE DRAWINGS

FIG. 1 is a side view of a caravan according to the invention in the transport position.

FIG. 2 is an end view as seen from the right in FIG. 1.

FIG. 3 is a horizontal cross-section of this caravan in the position of use.

FIG. 4 is a schematic plan view of the caravan according to FIGS. 1 to 3, in which both sections of the upper structure have been indicated with heavy lines in a position between the transport position and the position of use, and with thin lines in the position of use.

FIG. 5 is a horizontal cross-section through the upper structure of the caravan in the living/dining situation.

FIG. 6 is a horizontal section as in FIG. 5, but in the sleeping situation.

DESCRIPTION OF THE PREFERRED EMBODIMENT

Figure 7:
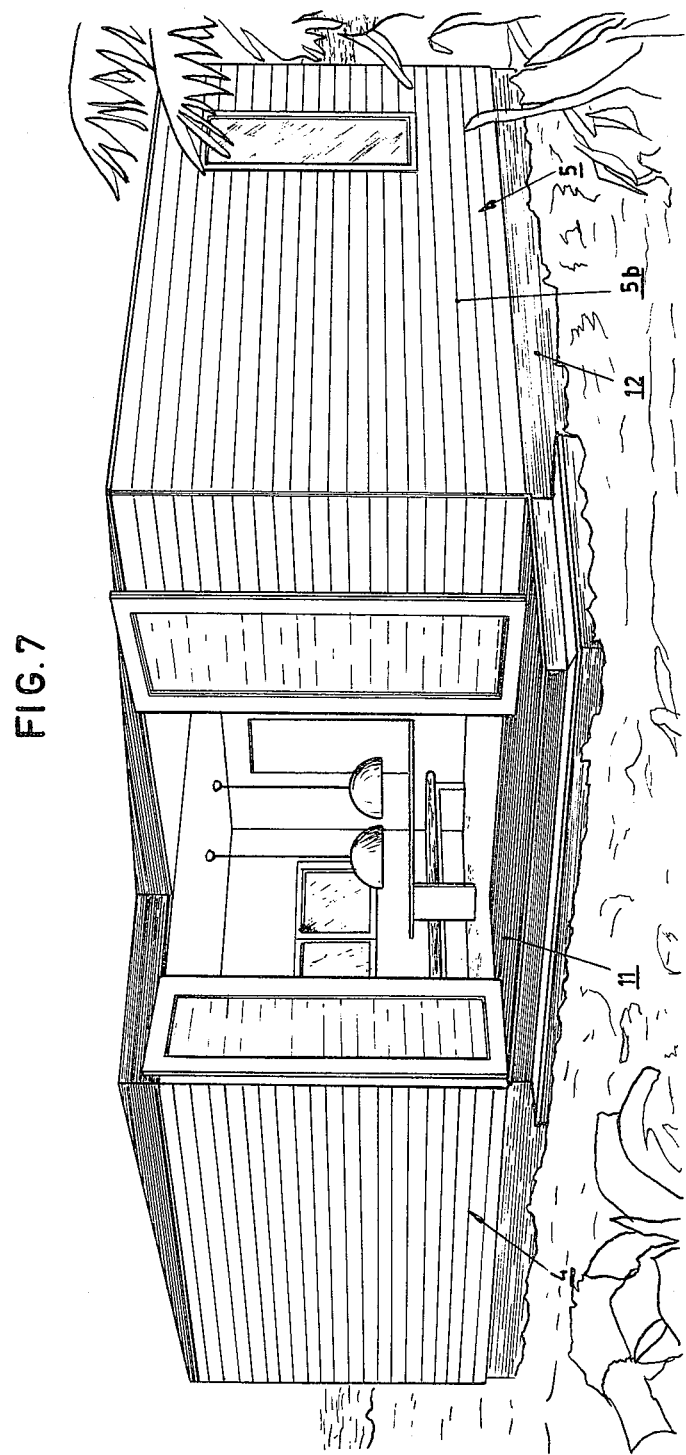
FIG. 7 is a perspective view of the caravan according to the invention in the position of use and as seen from the terrace.

The caravan mounted on wheels 1 (FIGS. 1 and 2) and provided with a towing bracket 2 comprises two sections 4 and 5 movably mounted on the substructure 3.

The width B of the sections 4 and 5 e.g. corresponds with the largest width which is permissible on the basis of the regulations which are in force for the road traffic, the lengths $L_1$ and $L_2$ being each larger than the width B, and $L_1$ being larger than $L_2$.

The sections 4 and 5 are pivotally connected to each other around a vertical axis 6, which in the transport position of the caravan (FIGS. 1 and 3) is contained in the plane of one longitudinal side wall of the caravan.

The section 4 is pivotally mounted around a vertical axis on the substructure 3. The pivot 7 is contained in the central longitudinal plane of the substructure 3 and at equal spacing from the side walls 4a, 4b and the end wall 4c. The section 5 is likewise pivotally mounted around a vertical axis on the substructure 3. The pivot 8 is likewise contained in the central longitudinal plane of the substructure 3 but is moreover slidable along to the longitudinal axis of the substructure.

The pivotal connection and the pivotal slidable connection respectively between both sections 4 and 5 and the substructure 3 may have different embodiments with the intermediary of pivot shafts, pivotal discs and/or supporting and guiding rollers. Detailed description and illustration thereof are considered to be superfluous for a good comprehension of the invention.

In the transport position (FIGS. 1 and 2) the sections 4 and 5 may be locked in different manners, e.g. by means of locks or bolts (not shown in the drawing) provided adjacent to the plane of division between both sections on the side walls 4b and 5b thereof. After unlocking the caravan may be brought from the transport position into the position of use according to FIGS. 5 to 7. Thereto the section 4 is rotated in the direction of the arrow (FIG. 4) whereby the section 5 is taken along by carrying out a pivotal movement around the point 8 and a simultaneous displacement of this pivot point in the longitudinal direction of the substructure. After a rotation through 90° the position of use is reached. In this position of use the end surfaces 4c and 5c of both sections, which in the transport position engage each other and are situated transverse to the longitudinal direction of the caravan, arrive at the exterior and form one of the exterior walls of the house having a horizontal L-shaped cross-section. The walls 4a and 5a which form in the transport position one of the longitudinal side walls of the caravan, coincide in the position of use along a length corresponding to that of the wall 5a. In the embodiment shown the walls 4a and 5a are constructed, in the portion in which they overlap in the position of use, as removable walls, which removable walls can be stored in a space formed therefor behind cupboard ranges 9 and 10 (vide FIGS. 3, 5 and 6) provided at the end walls 4c and 5c respectively of the sections. In this position, which is shown in FIG. 5, the sections 4 and 5 delimit together one undivided room, having a horizontal L-shaped cross-section, which is suitable as a living-, dining room. On the other hand the slidable walls 4a and 5a may be used to subdivide the L-shaped room into three compartments (vide FIG. 6) in which two compartments together occupy the volume of the section 4 and the third compartment corresponds with the volume of the section 5. Therefore the removable wall 5a of the section 5 is slid into its normal closed position which it also occupies in the transport position according to FIG. 1. The removable wall 4a of the section 4 on the contrary is slid into a position perpendicular to its normal position in the transport situation, for which purpose an auxiliary guide for the slidable wall 4a has been provided in the section 4 in the ceiling and/or on the bottom, said guide extending transverse to the longitudinal direction of the section 4. In this manner the usable room, subdivided by the slidable walls 4a and 5a into three compartments, has become suitable as sleeping rooms. A portion of the removable wall 5a may at the same time serve as an access door.

As appears from FIGS. 5, 6 and 7 the corner between the "legs" of the L-shaped house has been fitted up as a terrace. Thereto a terrace platform 11 has been provided in this corner, which may be carried in the transport position e.g. on the roof of the caravan or in a different manner. FIG. 7 shows moreover that the spaces below the house are closed along the outer side walls by means of boards 12 of wood or other suitable material, which may be easily mounted and removed.

Finally it is to be noted that the vertical and horizontal edges of the walls 4a and 5a of the sections 4 and 5, which engage each other in the position of use, may be provided with flexible ceiling strips or sections, which close together sealingly and therefore leakproof in the position of use.

It will be clear that within the field of the invention different modifications of the embodiment as shown in the drawing and described above may be devised.

I claim:

1. A mobile home comprising at least two sections arranged one behind another on a common integral substructure which is mounted on wheels, said sections being generally rectangular in plan and having vertical sides, characterized in that each of said sections is mounted on a pivot located in the central longitudinal plane of said common integral substructure, at least one of said pivots being longitudinally slidable in said substructure, two sections being hinged together at one corner of each section, and being movable on their pivots, from a transport position in which they are longitudinally aligned with one another and with said substructure, to a transverse position of use in which a side of one section and a side of the other section, formerly in alignment, are folded together on said hinge.

* * * * *